Figure 1:
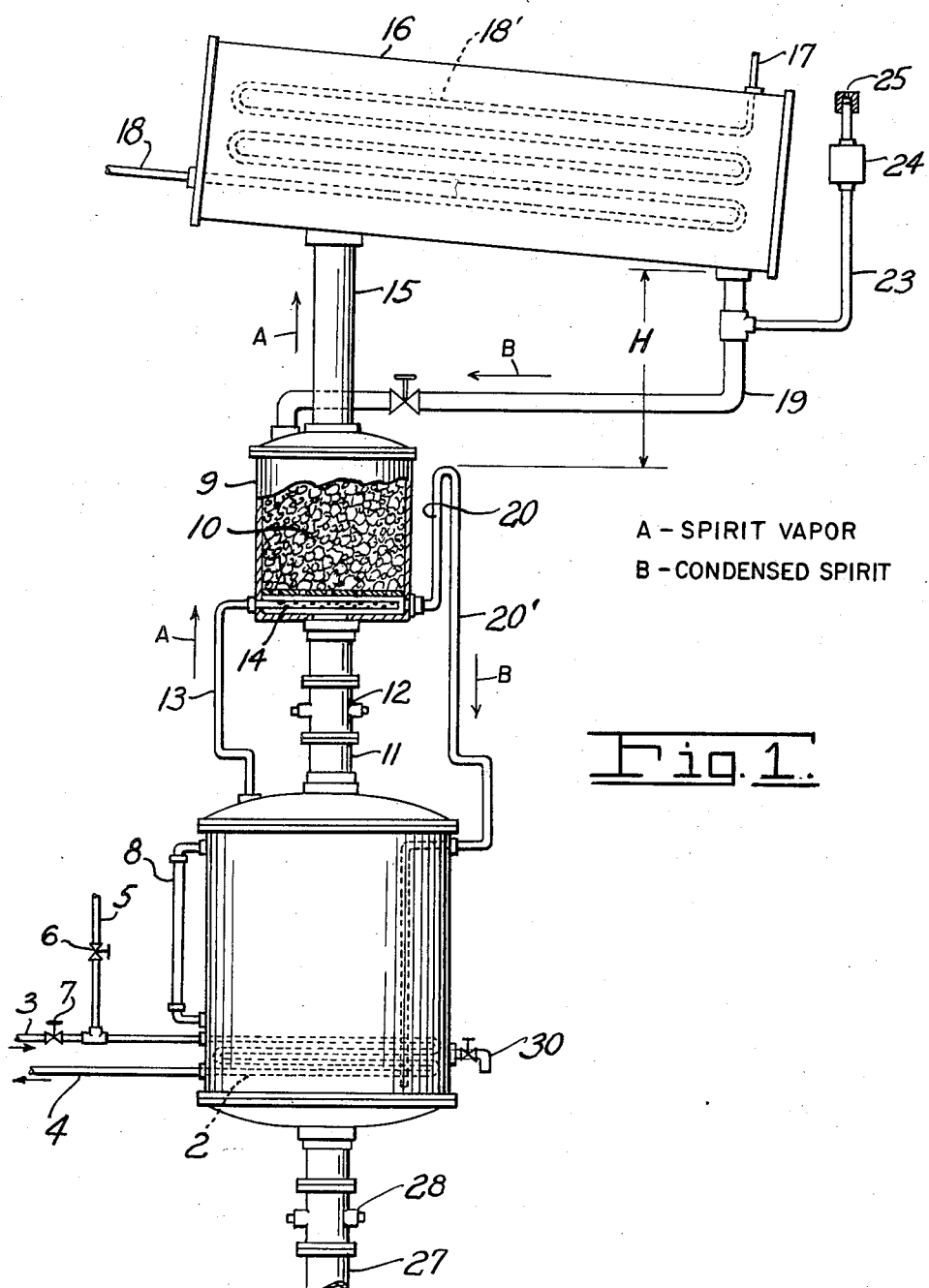

Dec. 9, 1958 C. M. DALMAU 2,863,773
METHOD AND APPARATUS FOR PURIFYING RAW DISTILLED SPIRIT
Filed Oct. 7, 1954 2 Sheets-Sheet 1

A – SPIRIT VAPOR
B – CONDENSED SPIRIT

INVENTOR.
CECILIO MARTINEZ DALMAU
BY
Zugelter & Zugelter
Attys.

1

2,863,773

METHOD AND APPARATUS FOR PURIFYING RAW DISTILLED SPIRIT

Cecilio Martinez Dalmau, Vedada, Havana, Cuba, assignor of ten percent to John L. Henderson, Cincinnati, Ohio, and forty-five percent to Fernando Herrera, Norwood, Ohio Application October 7, 1954, Serial No. 460,951

6 Claims. (Cl. 99—48)

This invention relates to a process and apparatus for purifying raw, distilled spirit, made by the distillation of a fermented mash. The mash may be made from corn, cereals, potato or other commonly used materials for the production of distilled spirit.

Raw spirit, such as used in the production of whisky for example, is harsh and contains various alcohols comprising fusel oil. The most objectionable of these are the isoamyl and the amyl alcohols.

The objectionable fusel oil alcohols have for years past been removed more or less by aging the raw, distilled spirit containing them, in charred oak casks or barrels, for period of time measured in years. Purification by the aging process involves expensive and extensive storage space, equipment and facilities and a heavy investment in aging casks or barrels.

Many attempts have been made to purify raw spirit, whisky for example, without resorting to the long and expensive aging process, but none so far, as I am aware, have been successful.

An object of this invention is to provide a process by which raw, distilled spirit, from the still, can be purified in a matter of a few hours; a process by which raw whisky can be purified in a few hours, to a quality equal to that of whisky which has been aged four or more years in charred oak containers or barrels.

Another object of the invention is to provide a process by which the objectionable fusel oil alcohols can be removed from raw, distilled spirit in a period of a few hours, less than twenty-four, to a degree equal of that obtained by aging such raw spirit in charred oak barrels for four or more years.

Specifically, it is an object of the invention to heat a quantity of raw, distilled spirit to the temperature at which it vaporizes, passing such vapor through a bed of vegetable charcoal, preferably activated charcoal, condensing the vapor and returning the condensed vapor to the body of heated spirit and recycling until the whisky has reached the state of purification desired.

Specifically, it is another object of the invention to vaporize raw whisky or spirit as above stated, passing the vapor through a bed of activated vegetable charcoal, condensing the vapor, and then returning the condensed vapor through the bed of charcoal on its return to the body of the heated spirit.

A still further object of the invention is to purify raw, distilled spirit as above stated, by recycling and then after a predetermined time, when the state of purity desired has been reached, recycling the purified spirit through comminuted wood, for example wood shavings, sawdust, etc., to impart the desired color and bouquet to the purified product.

A still further object of the invention is to purify a quantity of raw, distilled spirit by adding to such spirit a quantity of animal charcoal such as charred bone, heating the raw spirit to the temperature at which it vaporizes, then passing the vapor through a bed of activated vegetable charcoal, condensing the vapor and returning the vapor to the body of the heated raw spirit and recycling the vapor and condensate until the whisky or spirit has been purified to the state of purity desired.

A still further object of the invention is to provide apparatus whereby the foregoing objects may be achieved in practice.

Other objects of the invention will in part be apparent and will in part be obvious to those of ordinary skill in the art to which the invention pertains from the following description taken in conjunction with the accompanying drawings.

Figure 2:
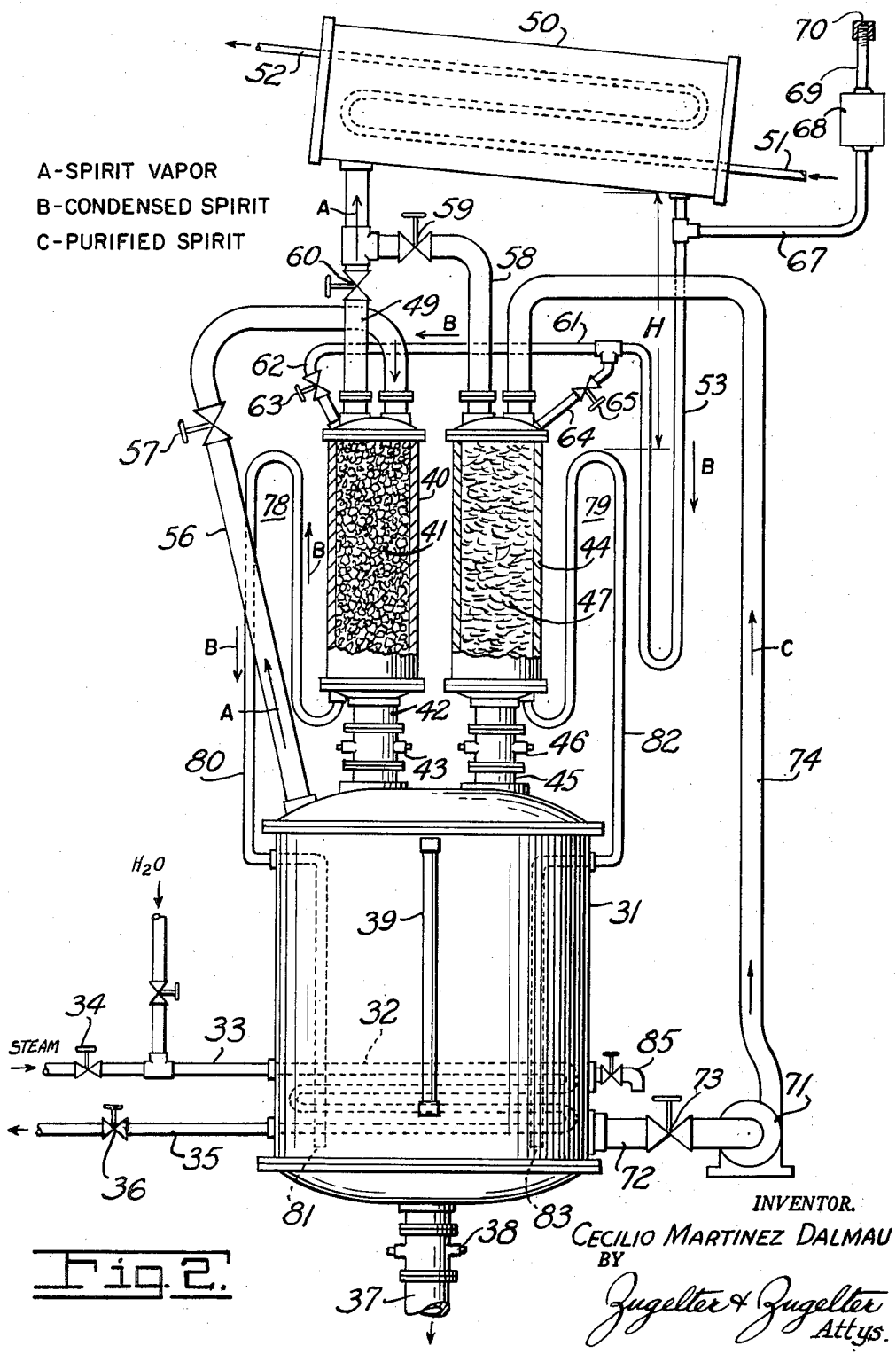

In the drawings:

Fig. 1 is a more or less diagrammatic view of apparatus arranged and constructed in accordance with an embodiment of the invention and by means of which the method of the invention may be practiced; and Fig. 2 is a more or less detailed illustration of apparatus arranged and constructed in accordance with an embodiment of the invention and by means of which the process of the invention may be practiced.

In accordance with the method of this invention, raw distilled spirit is purified by removing objectionable fusel oil alcohols such as the isoamyl and the amyl alcohols. The spirit is purified by heating a given quantity or batch of the spirit to a temperature at which it vaporizes. The body of spirit so heated may contain a quantity of animal charcoal such as charred bone, which remains in the body of the raw spirit during the process. As the raw, distilled spirit is vaporized, it is passed through a bed of vegetable charcoal, preferably of the activated type. After the vapor has passed through the vegetable charcoal bed, it is condensed and the condensate returned to the batch of the spirit being heated and vaporized.

In a preferred form of the invention, the condensed spirit is returned to the bed of vegetable charcoal, through which it flows on its return to the batch of distilled spirit. The process is continued for such a length of time that the spirit batch will have been sufficiently vaporized and recycled through the charcoal bed, as vapor and condensate, to effectively remove the objectionable fusel oil alcohols, for example the amyl and the isoamyl alcohols, to the required extent.

The purified spirit is sampled from time to time to determine its quality as the process progresses. The quality is measured by the degree of removal of the objectionable fusel oil alcohols. When the spirit has been purified to the desired degree, it is then passed through comminuted wood particles, such as oak shavings, sawdust and the like, until it has acquired the desired color and bouquet. The purified spirit is then cooled, filtered and stored. After filtering, the purified spirit may be flavored as desired depending upon the particular finished product sought.

The practice of the process is illustrated by the diagrammatic apparatus shown in Fig. 1. That apparatus includes an evaporator such as closed kettle 1, provided with heating coils 2, which can be supplied with steam through a supply pipe 3. The condensed steam discharges from the coil through a pipe 4. The pipe 3 is provided with a pipe 5, through which cooling water may be supplied to the heating coils 2 to cool the purified spirit before filtering. A valve 6 is provided in the cooling pipe 5, and a valve 7 in the steam pipe 3, so that when steam is being supplied to the coils, valve 6 may be closed, and when cooling water is to be supplied, valve 7 is closed and valve 6 opened. Kettle 1 is provided with a sight glass 8, by which the level of spirit in the kettle may be gauged.

The apparatus includes a purifier 9, in which is a bed 10 of charcoal of the activated vegetable type. The purifier 9 is connected to the top of the kettle 1 by means of a pipe 11, having therein a valve 12. Valve 12 is closed until the end of the process. Spirit vapor flows from kettle 1 to purifier 9 through a pipe 13 to a header or distributor 14 located inside the purifier and at the bottom of bed 10.

The vapor passing through the bed 10 is conducted by a pipe 15 into a water-cooled condenser 16. Cooling water may be introduced into the condenser at 17 and discharged at 18. The cooling water flows through coils 18' within the condenser housing so that the spirit vapors are condensed on the surface thereof. The condensed vapor flows out of the condenser through a pipe 19 into the purifier 9, where it accumulates until it overflows an inverted U-column 20. The top of column 20 is at a level near the top of the charcoal bed 10 in purifier 9. The condensed vapor discharging from column 20 flows through a pipe 20' into the kettle 1. As shown, the discharge end of pipe 20' is located near the bottom of the kettle, so that it is always submerged in the spirit liquid in the kettle, thus preventing vapor locking of column 20'.

Non-condensing vapors, such as $CO_2$, which enter the condenser 16 with the spirit vapor are discharged to the atmosphere through a bleed-off device 23, having a trap 24 and a discharge orifice 25. The bleed-off device 23 also prevents the forming of a vacuum in the pipe 19, which would interfere with the gravity flow of the condensed spirit through the charcoal bed 10 to the kettle 1.

Raw spirit to be purified is introduced into the kettle 1 through a pipe 27 having a valve 28 therein. The kettle is filled to a level slightly below the top of the sight gauge 8, after which the valve 28 is closed. Steam is then supplied the heating coils 2 at such a rate that the raw spirit is heated to a temperature at which it vaporizes. The vapor passes out of the kettle through the charcoal bed 10, is condensed in the condenser 16 and returned as condensate to the purifier 9. When the purifier 9 has been filled with condensed spirit to the point where it overflows the column 20' and returns to the kettle, the cycling operation is in full course. The head H of condensed liquid spirit is greater than the vapor pressure so that the liquid will flow through the purifier 9 on its return from the condenser. Also the pressure established in kettle 1 will always be just sufficient to cause the spirit vapor to bubble through the charcoal bed 10 and the condensed liquid spirit therein.

The raw spirit is recycled as above for a period of time, varying from three hours to fourteen or fifteen hours, more or less, depending upon the final quality desired in the purified spirit. From time to time a sample may be drawn from the kettle through a sampling cock 30. The sample on analysis will show when the distilled spirit has been purified to the degree desired.

It appears that in vaporizing the raw spirit that objectionable fusel oil alcohols are carried over with the vapor and absorbed by the activated charcoal bed 10. Also on return from the condenser as liquid, the liquid spirit is further purified by contact with the charcoal 10. Also the animal charcoal in the kettle 1 effects removal by absorption of objectionable fusel oil alcohols.

After a batch of spirit has been purified as stated, the charcoal bed 10 will have an accumulation of gunk, the odor and taste of which is horrible. That gunk can be burned off and the charcoal reactivated for re-use.

The raw spirit having been purified, it may be withdrawn from the kettle 1 through pipe 27 and filtered. Before filtering, the purified spirit may be passed through wood particles, such as shavings, sawdust and the like, until it has acquired the desired color and bouquet. After filtering the thus treated spirit, it is put in storage. It may be further treated by adding flavoring materials as required.

In Fig. 2 a more detailed illustration of apparatus suitable for carrying out the method of purifying raw, distilled spirit is shown. The apparatus includes a kettle or vaporizing vessel 31, having steam-heating coils 32 therein near the bottom thereof. The steam is supplied to the coils by a steam pipe 33, having therein a valve 34. The steam discharging from the coils is conducted through a pipe 35, having a valve 36 therein to discharge. The bottom of the vaporizer 31 is provided with a pipe 37, having a valve 38 therein, by means of which the vaporizer 31 may be charged with raw spirit. The vaporizer is provided with a sight gauge 39 by means of which the quantity charged into the vaporizer may be gauged. At the top of the vaporizer 31 is a cylinder 40, having therein a bed of charcoal 41 of the vegetable type, such as activated oak charcoal or other suitable activated charcoal. The bottom of cylinder 40 is connected by a pipe 42 to the top of vaporizer 31. A valve 43 in pipe 42 may be opened or closed or partially opened during operation as will be explained infra. The apparatus also includes a cylinder 44 which is connected at its bottom by a pipe 45 to the top of vaporizer 31, and that pipe is provided with a valve 46 which may be closed or open depending upon the particular phase of the process being carried out. Cylinder 44 is provided with comminuted wood 47, such as shavings or sawdust or oak or other suitable wood. The top of cylinder 40 is connected by a pipe 49 to a condenser 50. The condenser 50 includes cooling coils through which water is circulated, the water being introduced at 51 and discharged at 52. Condensed spirit flows from the condenser through a pipe 53 to cylinder 40 during the purification process and thence to the vaporizer 31. The condensed spirit may be returned also to cylinder 44 in a particular stage of the process for the purpose of giving color and bouquet to the purified spirit. The top of the kettle or vaporizer 31 is provided with an outlet pipe 56 having a valve 57 therein. The pipe leads to the top of cylinder 40. The top of cylinder 44 is provided with a pipe 58 that is connected through a valve 59 to pipe 49 at a location above a valve 60 in pipe 49. The return pipe 53 is connected to a header 61. A pipe 62 having a valve 63 therein connects the header with the top of cylinder 40. The header 61 also is provided with a pipe 64 having a valve 65 therein, the pipe leading to the top of cylinder 44.

In order to provide for the venting of uncondensed gases, such as carbon dioxide for example, that pass into the condenser 50, the pipe 53 is provided with a venting device 67 having a trap 68 and an upwardly extending pipe 69 from which the gases escape to the atmosphere. The venting device 37 also prevents the forming of a vacuum on the down-leg pipe 53 which would interfere with the free return of the condensed spirit to the selected cylinders 40 or 44.

The apparatus may also be provided with a pump 71 for forced circulation of the purified spirit from the vaporizer 31 through the cylinder 44 and the bed of chips 47 therein. The pump as shown is connected to the bottom of vaporizer 31 by a pipe 72 having a valve 73 therein, the discharge of the pump being connected by a pipe 74 leading to the top of cylinder 44.

The cylinders 40 and 44 are provided with inverted U-columns 78 and 79 respectively. These columns are connected to the lower ends of the cylinders and extend upwardly to a point corresponding to the upper surface of the bed of charcoal 41 or the bed of wood shavings 47. The U-column 78 has a down leg 80 that leads into the vaporizer 31 and discharges at a point 81 near the bottom of the vaporizer. Similarly the column 79 has a down leg 82 that enters the vaporizer 31 near the top as shown and discharges at a location 83. Therefore the discharge ends 81 and 83 are well below the liquid level in the vaporizer 31 so that the vapor pressure can not interfere with the gravity flow of the condensed spirit vapor into the vaporizer 31 from the condenser 50.

Assuming that it is desired to purify a quantity of raw, distilled spirit, the vaporizer 31 is filled through pipe 37 and valve 38 to the desired level, and steam turned on to the coils 32. Valves 46, 59 and 65 are closed and valves 43, 57, 60 and 63 are opened. The openings of valves 43 and 57 are so adjusted relative to one another that the amount of vapor flowing upwardly through the charcoal bed 41 may be regulated. By fully closing valve 57 and opening valve 43, all of the vaporized spirit will flow through the charcoal bed 41. However, by adjusting the relative openings of these valves the quantity of vapor passing through the charcoal bed may be adjusted. As the vapor passes through the charcoal bed 41, it rises through pipe 49 into the condenser 50 where it is condensed. The condensed spirit vapor flows down the down leg 53 to the header 61 (valve 65 being closed) through pipe 62 and valve 63 into the charcoal bed 41. The condensate returning to the cylinder 40 accumulates until it overflows the column 78 into the down leg 80 to the bottom of the liquid spirit in the evaporator 31.

As the heat is continuously applied, the vapor continues to pass through the charcoal bed 41 into the condenser and back to the charcoal bed 41 until the spirit in the evaporator 31 has been sufficiently recycled to effect removal of the objectionable fusel oil alcohols by absorption in the charcoal bed 41. Also as was stated in connection with the description of Fig. 1, the raw spirit when introduced into the evaporator 31 contains a quantity of animal charcoal such as charred bone. The charred bone also effects removal of objectionable fusel oil alcohols. Objectionable fusel oil alcohol is carried over with the vapor into the charcoal bed 41 where they are removed by absorption. Also the condensed spirit which accumulates in the cylinder 41 is subjected to absorption whereby further objectionable fusel oil alcohols are removed.

I have found that raw distilled spirit which has been produced by good fermentation practice can be purified in three to four hours to such a degree that its quality will be the equal of spirit which has been aged in oak charred casks for four to five years. If the raw spirit has been produced from mash that has been poorly fermented, it may take from five to fifteen hours to purify the raw, distilled spirit to a quality that is the equal of spirit which has been aged in charred oak casks or barrels.

The quality of the purified spirit is determined by examination of samples taken from the liquid spirit in the evaporator 31. For that purpose a sampling cock 85 is provided. When examination shows that the spirit has been purified to the quality desired, the valves 43, 57, 63 and 60 are closed and valves 59 and 65 and 73 are opened and the pump 71 started. The pump forces the spirit from the evaporator through the top of container 44 where the spirit flows downwardly through the shavings 47 and thence back to evaporator 31. The spirit is circulated through the wood chips 47 for a time sufficient to impart the desired bouquet and color to the spirit.

Before utilizing pump 71 it is also possible to open valve 65 so that part of the returning condensed spirit vapor traveling down the down leg 53 is distributed to both of containers 40 and 44. Thus the color and bouquet may be imparted to the spirit while it is being purified.

The apparatus shown in Fig. 2 may also be operated by closing valve 43 and opening valve 57 during the purification stage. In that event the vapor from the evaporator 31 passes into the top of cylinder 40 and thence upwardly through pipe 49 to the condenser. The condensed spirit vapor is then returned to the charcoal bed 41 where it is purified by absorption.

In carrying out the process by means of the apparatus illustrated in Figs. 1 and 2, it will be observed that the purification is effected when the spirit is in the vapor as well as in the liquid phase, both phases being at elevated temperatures.

After a batch of raw spirit has been purified, the liquid spirit trapped in cylinders 40 and 44 is discharged into kettle 1 through the valves 43 and 46.

Having thus described the process and the apparatus embodying the invention, it will be apparent to those of ordinary skill in the art to which the invention pertains that various modifications and changes may be made in the illustrated embodiments without departing from either the spirit or the scope of the invention.

Therefore, what is claimed as new and desired to be secured by Letters Patent is:

1. Apparatus for purifying raw spirit to the equivalent of spirit which has been aged in wood for periods of four years or more, comprising a kettle adapted to receive a batch of raw, distilled spirit, and having means for withdrawing purified spirit therefrom, means for heating the spirit in the kettle to a temperature at which it vaporizes, an outlet for said kettle through which vapor passes, a purifier having therein vegetable charcoal and an outlet for vapor, means connecting said kettle outlet to the purifier to cause the vapors to pass through the vegetable charcoal, a condenser connected to the vapor outlet of said purifier for receiving and condensing the spirit vapors passing through the characoal, means for returning the condensed spirit to said purifier on top of the charcoal to cause the condensed spirit to pass through the same, means for controlling the level of condensed spirit in the purifier and returning the condensed spirit to the body of spirit in the kettle.

2. Apparatus as in claim 1 in which a housing is provided having therein comminuted wood particles, the housing having a connection to the outlet of the condenser, and valve means for shutting off flow of condensed spirit to the purifier containing the vegetable charcoal and means for returning the condensed spirit from the housing to the body of spirit in the kettle.

3. Apparatus as in claim 1 in which the purifier is provided with an inverted U-column which is connected to the interior of the purifier at a location near its bottom and extending upwardly to a location below the top of the charcoal therein, the top of said column being connected to the kettle for returning the liquid spirit thereto.

4. A method of purifying raw, distilled spirit that consists in providing a batch of raw spirit, heating the batch to vaporize the same, passing all the spirit vapor into a bed of vegetable charcoal, conducting vapor from the bed outside the same and condensing it, returning the condensed spirit to the bed and thence to the batch and repeating the foregoing steps until the spirit has been purified to the quality desired.

5. A method as in claim 4 in which the condensed spirit is accumulated in the charcoal bed to a predetermined level, and then withdrawing said condensed spirit from the bed at a rate to maintain said level.

6. A method as in claim 4 in which the purified spirit is further vaporized and passed into a bed of comminuted wood particles, vapor is conducted from the same and condensed, the condensate is returned to the bed of wood particles and then returned to the batch, and repeating the foregoing steps until the desired color and bouquet is achieved.

References Cited in the file of this patent

UNITED STATES PATENTS

| | | |
|---|---|---|
| 6,881 | Falkman | Nov. 20, 1849 |
| 160,093 | Grube | Feb. 23, 1875 |
| 2,086,080 | Herrick | July 6, 1937 |